United States Patent
Park et al.

(10) Patent No.: US 7,599,624 B2
(45) Date of Patent: Oct. 6, 2009

(54) SYSTEM AND METHOD FOR SWITCHING CHANNELS USING TUNABLE LASER DIODES

(75) Inventors: Sahng Gi Park, Daejeon (KR); Su Hwan Oh, Daejeon (KR); Kwang Seong Choi, Seoul (KR); Moon Ho Park, Daejeon (KR); Yong Soon Baek, Daejeon (KR); Kwang Ryong Oh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 627 days.

(21) Appl. No.: 11/252,401

(22) Filed: Oct. 17, 2005

(65) Prior Publication Data

US 2006/0127093 A1   Jun. 15, 2006

(30) Foreign Application Priority Data

Dec. 15, 2004 (KR) .................. 10-2004-0106496
Jul. 9, 2005 (KR) .................. 10-2005-0061951

(51) Int. Cl.
*H04J 14/00* (2006.01)

(52) U.S. Cl. .................. 398/75; 398/67; 398/69; 398/72; 398/98; 398/99; 398/100; 398/102; 398/33; 398/195; 398/196; 370/352; 370/392; 370/389; 370/465; 725/121; 725/125; 725/129; 725/105

(58) Field of Classification Search ............ 398/46–48, 398/52, 58, 74, 75, 91, 66, 67, 68, 69, 70, 398/71, 72, 79, 98, 99, 100, 102, 182, 192, 398/193, 194, 195, 196, 197, 158, 159, 33, 398/38; 370/352, 389, 465, 392, 468, 390; 725/121, 125, 127, 129, 105, 106

See application file for complete search history.

(56) References Cited

U.S. PATENT DOCUMENTS 6,084,992 A * 7/2000 Weber et al. .................. 385/24
6,559,990 B1 * 5/2003 Matsuda .................. 398/102
6,592,272 B1 * 7/2003 Masucci et al. ............... 398/47

(Continued)

FOREIGN PATENT DOCUMENTS

KR   10-2002-0026634   4/2002

(Continued)

OTHER PUBLICATIONS

Harry Dutton, 'Understanding Optical Communications', IBM International Technical Support Organization, Sep. 1998.*

(Continued)

*Primary Examiner*—Hanh Phan
(74) *Attorney, Agent, or Firm*—Blakely, Sokoloff, Taylor & Zafman LLP (57) ABSTRACT

A channel switching function is added to a wavelength division multiplexing passive optical network (WDM-PON) system, which is an access optical network system, and the potential transmission rate is increased by combining wide wavelength tunable lasers and a time division multiplexing (TDM) data structure and properly using the necessary optical components. In addition, when the wavelength of a light source or an arrayed waveguide grating (AWG) changes, the wavelength is traced and the magnitude of a transmitted signal is maximized without an additional detour line using a loop-back network structure. Furthermore, fewer thermo-electric controllers (TECs) are required for stabilizing the temperature of an optical line terminal (OLT) using wavelength tunable lasers, each laser electrically changing its wavelength.

12 Claims, 7 Drawing Sheets

U.S. PATENT DOCUMENTS

| | | | |
|---|---|---|---|
| 6,763,191 | B1 | 7/2004 | Handelman |
| 7,155,127 | B2 * | 12/2006 | Akimoto et al. ............... 398/72 |
| 2001/0004291 | A1 * | 6/2001 | Tanaka et al. ............... 359/161 |
| 2002/0048067 | A1 * | 4/2002 | Handelman et al. ......... 359/139 |
| 2003/0020981 | A1 * | 1/2003 | Vujkovic-Cvijin .......... 359/124 |
| 2004/0033076 | A1 | 2/2004 | Song et al. |
| 2004/0184805 | A1 | 9/2004 | Shin et al. |
| 2004/0184806 | A1 * | 9/2004 | Lee et al. ...................... 398/79 |

FOREIGN PATENT DOCUMENTS

| | | |
|---|---|---|
| KR | 2002-0026634 | 4/2002 |
| KR | 10-2004-0057864 | 7/2004 |

OTHER PUBLICATIONS

"A Low Cost WDM Source with an ASI Injected Fabry-Perot Semiconductor Laser", IEEE Photonics Technology Letters, vol. 12, No. 8, Aug. 2000, H. Kim, et al., pp. 1067-1069.

Spectral slicing WDM-PON using wavelength-seeded reflective SOA's, P. Healey, et al., Electronics Letters, Sep. 13, 2001, vol. 37, No. 9, p. 1181-1182.

"LARNet, a Local Access Router Network", IEEE Photonics Technology Letters, vol. 7, No. 2, Feb. 1995, M. Zimgibl, et al., pp. 215-217.

* cited by examiner

SYSTEM AND METHOD FOR SWITCHING CHANNELS USING TUNABLE LASER DIODES

CROSS-REFERENCE TO RELATED PATENT APPLICATION

This application claims the benefit of Korean Patent Application Nos. 10-2004-0106496, filed on Dec. 15, 2004, and 10-2005-0061951, filed on Jul. 9, 2005, in the Korean Intellectual Property Office, the disclosures of which are incorporated herein in their entirety by reference.

BACKGROUND OF THE INVENTION

1. Field of the Invention

The present invention relates to an access optical communication network, and more particularly, to the structure of an optical communication network using a passive element between subscribers and a central office of a network provider.

2. Description of the Related Art

While up-to-date optical communication technology is applied to a backbone network, a coaxial cable is the main communication means for an access network, i.e. for data communication between a remote node and a typical home or an office, still testing optical communication.

However, since many subscribers use the access network, it is estimated that a large optical communication market will form when the access network technology matures, and thus much research has been carried out to preoccupy technologies necessary for forming the large optical communication market and to secure intellectual property rights.

The strongest scheme researched as a communication means for the access network is a wavelength division multiplexing passive optical network (WDM-PON) supporting a method of simultaneously passing several channels allocated to a plurality of optical wavelengths through a single optical fiber using a passive element.

The present invention traces wavelength optical signals carried on channels in a WDM-PON by switching channels using wavelength tunable lasers and combining a time division multiplexing (TDM) concept to the channel transmission method, thereby increasing the transmission efficiency.

In "Spectral slicing WDM-PON using wavelength-seeded reflective SOAs," IEE Electron. Lett., Vol. 37, No. 19, pp 1181-1182, 2001, reported by P. Healey et al, which is one of the representative WDM-PON structures that have been suggested or reported, a method of spectrally slicing light of an erbium doped fiber amplifier (EDFA) or a light emitted diode (LED) into a plurality of wavelengths using an arrayed waveguide grating (AWG), allocating channels to the wavelengths, amplifying the channel-allocated wavelengths using a reflective semiconductor optical amplifier (RSOA), and modulating the amplified wavelengths to generate a data signal and then transmitting the generated data signal was suggested, and a test result obtained by transmitting data signals of 8 channels of 1.25 GHz over a distance of 25 Km using the method was reported.

In "A Low-cost WDM source with an ASE injected Fabry-Perot semiconductor laser," IEEE Photon. Technol. Lett., Vol. 12, No. 8, pp. 1067-1069, 2000, reported by Hyun Deok Kim. et al, which is another one of the representative WDM-PON structures that have been suggested or reported, a method of generating a data signal by slicing light of a light source into a plurality of wavelengths and inputting the wavelengths to a wavelength selectable Fabry-Perot laser diode (FP-LD) was suggested, and a test result obtained by transmitting the data signal at 155 Mbps over a distance of 120 Km using the method was reported.

In addition, in "LARNet, a Local Access Router Network," IEEE Photon. Technol. Lett., Vol. 7, No. 2, pp. 215-217, 1995 reported by M. Zirngibl. et al, a method of forming a multi-frequency laser (MFL) by engraving a distributed Bragg reflector (DBR) grating in each channel waveguide of an AWG and generating a data signal using the MFL was suggested, and a test result obtained by transmitting data signals of 9 channels at 200 Mbps over a distance of 10 Km using the method was reported.

The conventional methods described above do not suggest any improvement of a transmission rate through channel switching and wavelength tracing functions, as suggested in the present invention. Thus, a channel switching method and system for improving the transmission efficiency through the channel switching and wavelength tracing function in a WDM-PON will be suggested in the present invention.

SUMMARY OF THE INVENTION

The present invention provides a method and system for improving a transmission rate by switching wavelengths of channels generated using wavelength tunable lasers.

The present invention also provides a method and system for improving a transmission efficiency in a wavelength division multiplexing passive optical network (WDM-PON) by switching wavelengths using wide wavelength tunable lasers and combining a time division multiplexing (TDM) concept with the channel transmission.

The present invention also provides a method and system for tracing wavelengths and optimizing the magnitude of a transmitted signal using an appropriate network structure when the wavelength of a light source or an arrayed waveguide grating (AWG) changes.

The present invention also provides a method and system for minimizing the number of thermo-electric controllers (TECs) required for temperature stabilization of an optical line terminal (OLT) by using wavelength tunable lasers which change wavelengths electrically.

According to an aspect of the present invention, there is provided a channel switching system using wavelength tunable lasers in a wavelength division multiplexing passive optical network (WDM-PON), the system comprising: a signal generator generating signals on N channels using light sources, each light source including a wavelength tunable laser; a channel tuner switching channels by changing wavelengths of the lasers so that a predetermined number of channels of the N channels have the same wavelength; and a time division multiplexing (TDM) unit time-multiplexing the predetermined number of channels having the same wavelength.

According to another aspect of the present invention, there is provided a channel switching system using wavelength tunable lasers in a wavelength division multiplexing passive optical network (WDM-PON), the system comprising: a channel switching unit switching N channels using light sources, each light source including a wavelength tunable laser; a signal detector detecting a wavelength optical signal of a channel generated by the channel switching unit, transmitted downstream to an optical network unit (ONU), and transmitted upstream to an optical line terminal (OLT); and a tracer optimizing a signal of the signal detector by monitoring a relative magnitude change between the signal of the signal detector and a signal of a light source state detector and properly changing wavelengths of the light sources and a temperature of a thermo-electric controller if the signal of the signal detector deteriorates.

According to an aspect of the present invention, there is provided a channel switching method using wavelength tunable lasers in a wavelength division multiplexing passive optical network (WDM-PON), the method comprising: generating signals on N channels using light sources, each light source including a wavelength tunable laser; switching channels by changing wavelengths of the lasers so that a predetermined number of channels of the N channels have the same wavelength; and time-multiplexing the predetermined number of channels having the same wavelength.

According to another aspect of the present invention, there is provided a channel switching method using wavelength tunable lasers in a wavelength division multiplexing passive optical network (WDM-PON), the method comprising: generating signals on N channels using light sources, each light source including a wavelength tunable laser; detecting a wavelength optical signal of a channel generated in the generating of the signals on N channels, transmitted downstream to an optical network unit (ONU), and transmitted upstream to an optical line terminal (OLT); and optimizing a signal of a signal detector by monitoring a relative magnitude change between the signal of the signal detector and a signal of a light source state detector and properly changing wavelengths of the light sources and a temperature of a thermo-electric controller if the signal of the signal detector deteriorates.

DETAILED DESCRIPTION OF THE INVENTION

The present invention will now be described more fully with reference to the accompanying drawings, in which exemplary embodiments of the invention are shown. In the drawings, the same or similar elements are denoted by the same reference numbers even when depicted in different drawings.

In the following description, well-known functions or constructions are not described in detail, since this would obscure the invention in unnecessary detail.

It will be understood by those skilled in the art that various changes in form and detail may be made therein without departing from the spirit and scope of the invention.

Figure 1:
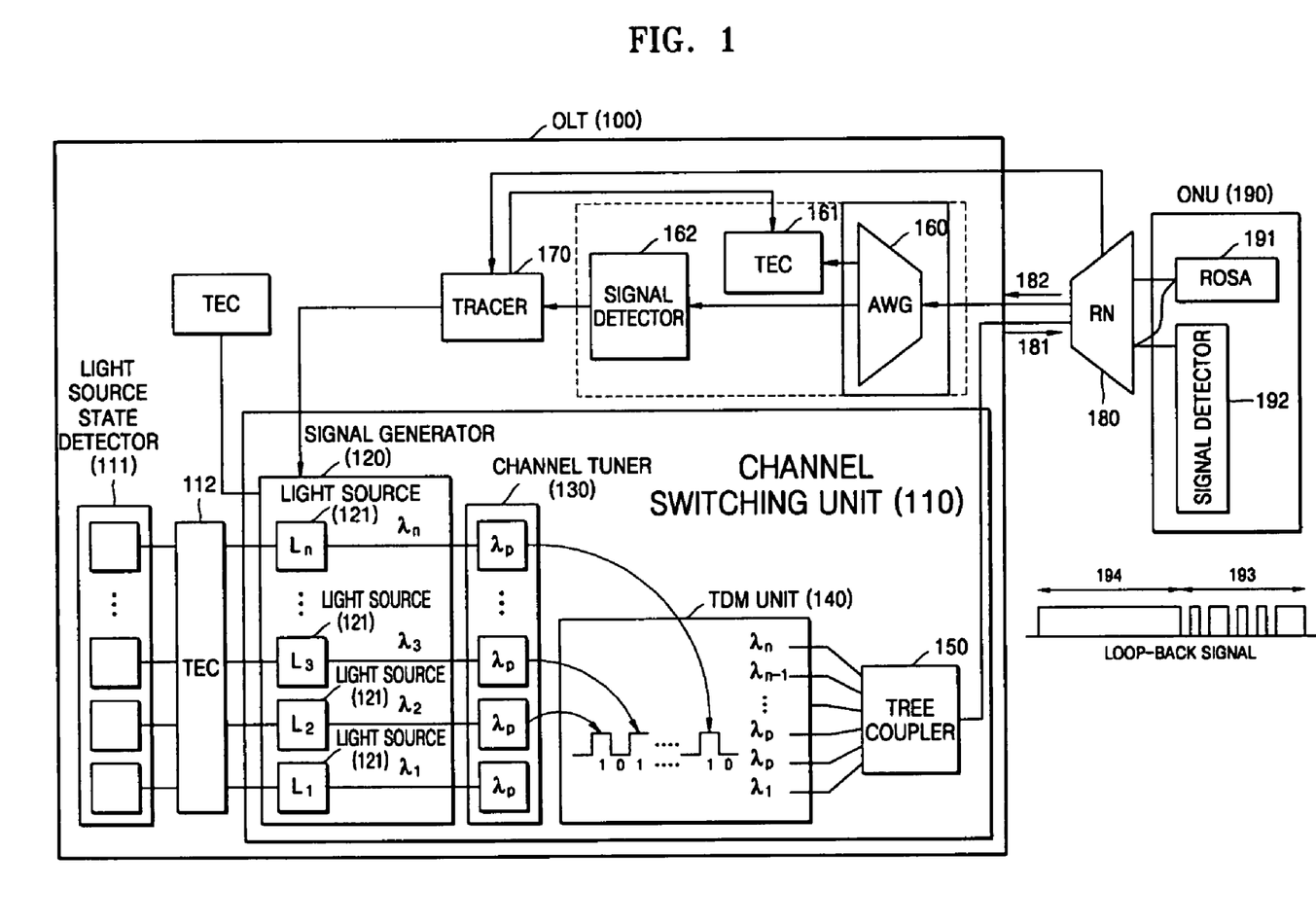
FIG. 1 is a block diagram of the basic network configuration of a WDM-PON.

The meaning of "channel switching" used in the present specification is that instead of generating a wavelength originally allocated to each channel, a wavelength different from the originally allocated wavelength is generated for each channel using a wavelength tunable laser. For example, it is default that N light sources L1, L2, . . . , Ln-1, Ln respectively generate wavelengths $\lambda1, \lambda2, \ldots, \lambda n-1, \lambda n$. However, if the light source L2 generates the wavelength $\lambda1$ although being supposed to generate $\lambda2$, this is channel switching. FIG. 1 is a block diagram of the basic network of a wavelength division multiplexing passive optical network (WDM-PON).

Referring to FIG. 1, the WDM-PON, which has a structure including a plurality of optical network units (ONUs) connected to a central office (CO) via several optical links using a WDM method, includes an optical line terminal (OLT) 100 included in the CO, a remote node (RN) 180, and ONU 190.

The CO, namely a feeder network, generates an optical signal having a plurality of different wavelengths and transmits the generated optical signal to the RN 180, and receives a signal transmitted from the ONUs 190 to the CO via the RN 180.

The OLT 100, is commonly located in the CO of a communication provider, and includes a signal generator 120, a channel tuner 130, a TDM unit 140, a light source state detector 111, a thermo-electric controller (TEC) 112, a tree coupler 150, an AWG 160, a signal detector 162, and a tracer 170.

Each ONU 190, in other words a distribution network, receives each WDM signal distributed by the RN 180 and transmits the received WDM signal to each subscriber, or carries a plurality of sub-carrier multiplexing (SCM) signals from each subscriber to the OLT 100 on a WDM wavelength and transmits the WDM wavelength to the RN 180.

The ONU 190 installed for an individual subscriber includes a reflective semiconductor optical amplifier (RSOA) 191 and a signal detector 192 for detecting transmitted signals.

The RN 180, which is located between the CO and the ONU 190, demultiplexes an optical signal having a plurality of wavelengths transmitted from the CO to the ONU 190 using a passive optical element such as an AWG, as well as transmitting a plurality of WDM channels from the ONU 190 to the CO by multiplexing the plurality of WDM channels.

In the network illustrated in FIG. 1, a loop-back signal is used as a transmission signal according to an embodiment of the present invention. Since such network does not require an optical generator such as a laser or an LED, but only an optical amplifier (e.g. an RSOA or SOA) for each ONU, the price of the ONU installed for a subscriber can be low, and the management and maintenance of the ONU is easy. Such an access network operates within a distance of 20 Km.

The channel switching WDM-PON of FIG. 1 operates as follows.

N-channel wavelength optical signals generated by light sources 121 in the OLT 100 are extracted by the tree coupler 150 from optical lines, decoupled into individual channels by the RN 180, and transmitted to relevant ONUs 190 (downstream).

A portion of a signal transmitted to the ONU 190 is detected by the signal detector 192, and the remaining portion is amplified by the RSOA 191 and transmitted to the OLT 100 after ONU data is carried on a corresponding portion of a loop-back signal (upstream).

ONU signals are multiplexed by the RN 180, demultiplexed by the AWG 160 of the OLT 100, and detected by the signal detector 162 of the OLT 100.

Here, the OLT 100 and the ONU 190 use a loop-back signal as a transmission signal. The loop-back signal is generally classified into two parts 193 and 194.

The former portion of the loop-back signal has the same structure as a typical digital modulation signal 193, and the latter portion is a optical signal 194 on which no modulation signal is carried, which carries a signal to be transmitted from the ONU 190 to the OLT 100.

A channel switching unit 110 of FIG. 1 includes the signal generator 120, the channel tuner 130, and the TDM unit 140.

The signal generator 120 generates signals on N channels using the N light sources 121.

Each light source 121 generates a wavelength optical signal which carries downstream data transmitted from the OLT 100 in the WDM-PON system to each ONU 190 using a wavelength tunable laser, the wavelength of which is changed electrically according to a current.

It is default that N light sources L1, L2, ..., Ln-1, Ln respectively generate wavelengths $\lambda 1, \lambda 2, \ldots, \lambda n-1, \lambda n$. However, since each of the N light sources generates a channel wavelength optical signal using the wavelength tunable laser, the light source L1 generating the wavelength $\lambda 1$ can generate another tuned wavelength optical signal such as $\lambda 2, \ldots, \lambda n-1, \lambda n$.

The laser can be implemented by a distributed Bragg reflector laser diode (DBR-LD) or a sampled grating distributed Bragg reflector laser diode (SGDBR-LD). The DBR-LD has a tunable zone of maximum 8~10 nm, and the SGDBR-LD has a wide tunable zone of over 35 nm. That is, if the channel spacing is 100 GHz (0.8 nm), the DBR-LD can generate signals on 10 channels using the same laser, and the SGDBR-LD can generate signals on over 40 channels using the same laser.

For a wavelength tunable laser which tunes wavelengths using temperature or a distributed feedback laser (DFL), the same number of thermo-electric controllers as light sources are required, and the thermo-electric controllers should be operated independently from each other, resulting in a very complicated temperature control.

However, according to an embodiment of the present invention, since the wavelength is changed electrically by a current using a wavelength tunable laser, such as a DBR-LD or an SGDBR-LD, as a light source 121 required for the OLT 100, the number of TECs 112 required for stabilizing temperature can be reduced. A minimum of one TEC 112 can be used, depending on the capacity.

The channel tuner 130 switches channels of wavelength optical signals having channels generated as default, by changing wavelengths of predetermined channels among the N channels using the wavelength tunable lasers if necessary.

The TDM unit 140 time-multiplexes the wavelengths of the predetermined channels changed by the channel tuner 130.

The channel switching unit 110 of FIG. 1 will be described in more detail with reference to FIG. 2 later.

The tree coupler 150 extracts wavelength optical signals from optical lines, couples optical signals of N channels generated by the N light sources 121 and time-multiplexed by the TDM unit 140, and transmits the coupled optical signal to the ONUs 190.

In the network structure of FIG. 1 according to an embodiment of the present invention, each ONU 190 uses a loop-back signal, and includes the signal amplifier 191 which amplifies a downstream wavelength optical signal transmitted from the OLT 100 and the signal detector 192 which detects the downstream wavelength optical signal transmitted to a corresponding ONU 190. The signal amplifier 191 includes an RSOA or an SOA.

The RSOA 191 is used for a loop-back pattern in the WDM-PON method. That is, the RSOA 191 amplifies a signal transmitted to the ONU 190, carries ONU data on the latter portion 194 of a loop-back signal, and transmits the loop-back signal to the OLT 100.

The RN 180 multiplexes signals amplified by the RSOAs 191 and transmits the multiplexed signal to the AWG 160 in the CO, and the AWG 160 demultiplexes wavelength optical signals of channels upstream transmitted from the ONUs 190 to the OLT 100.

In the WDM-PON, the wavelengths of the light sources 121 may change gradually due to external causes, e.g., temperature changes and/or gradual deterioration. Since the RN 180 is commonly installed outdoors, the wavelength of the RN 180 is likely to change due to fluctuating outdoor temperatures.

To trace the changing wavelengths, an upstream signal 182 from the ONU 190 to the OLT 180 detected in the CO is compared to a signal of the light source state detector 111.

If the wavelength of the AWG 160 in the CO is not equal to the wavelength of the RN 180, the signal detector 162 can detect that the intensity of light passing through the AWG 160 is lower.

If the wavelength of the AWG 160 in the CO is not equal to the wavelength of the RN 180, the tracer 170 controls corresponding components so that the two signals have the original intensity, by comparing the signal passing through the AWG 160 to the signal of the light source state detector 111.

The tracer 170 gradually changes the temperature of the TEC 161 in order to increase the intensity of an optical signal, by controlling the TEC 161 which controls the temperature of the AWG 160, and gradually changes the wavelengths of the light sources 121 in order to increase the intensity of an optical signal so that the magnitude of the optical signal is maximized.

That is, if the wavelength of the RN 180 changes, the tracer 170 controls the components so that the magnitude of the signal detected by the signal detector 162 is maximized by simultaneously changing the AWG temperature of the CO and the wavelengths of the light sources 121.

Figure 2A:
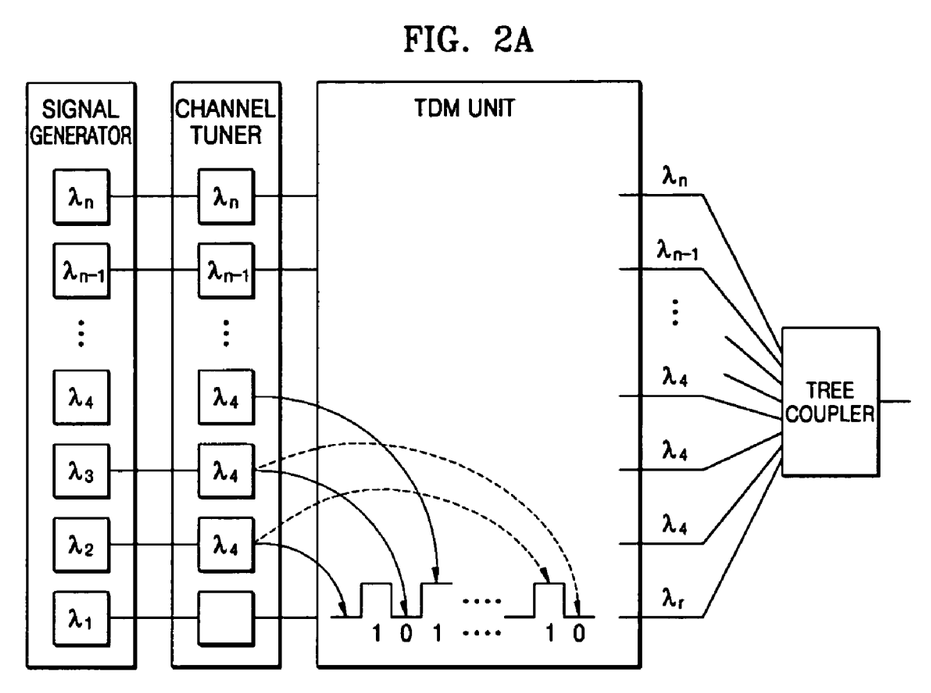
FIGS. 2A and 2B illustrate channel switching of predetermined channels among N channels in a channel switching unit according to an embodiment of the present invention.
Figure 2B:
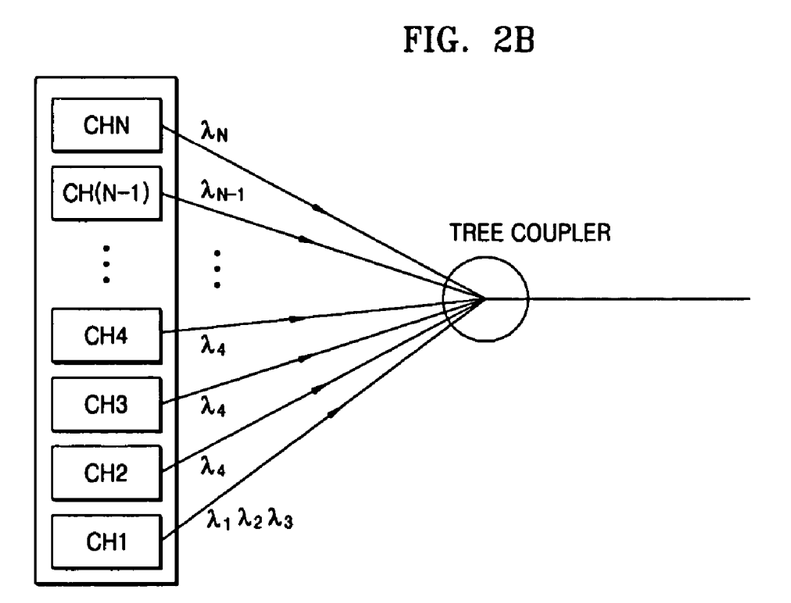

FIGS. 2A and 2B illustrate channel switching of predetermined channels among N channels in the channel switching unit 110 according to an embodiment of the present invention.

FIG. 2A shows a process of switching channels between 4 channels according to an embodiment of the present invention. If recipients of channel1, channel2, and channel3 do not have much data transmission volume, and a recipient of channel4 requests a high data transmission rate, a light source of channel1 generates wavelengths of channel1, channel2, and channel3 to transmit signals of the channel1, channel2, and channel3 by dividing the time.

For example, the time is divided into t1, t2, and t3, and the light source of channel1 generates $\lambda 1$ during t1, $\lambda 2$ during t2, and $\lambda 3$ during t3. Here, since each light source uses a wavelength tunable laser, the light source can generate different wavelengths.

The light sources of channel2, channel3, and channel4 generate the wavelength of channel4, and the OLT 100 time-multiplexes wavelength optical signals of channels to be transmitted downstream and transmits the time-multiplexed optical signal to the ONUs 190.

In more detail, the channel switching will now be described with reference to FIG. 2B.

When a signal "101010" is generated by the TDM unit 140, the TDM unit 140 divides a downstream transmission time of optical signals to be transmitted downstream from the OLT 100 to the ONU 190 into 6, $\lambda 4$ is generated on channel2, channel3, and channel4, and then the signal is transmitted by time-multiplexing the optical signals, i.e., allocating 1 to channel2, 0 to channel3, 1 to channel4, 0 to channel2, 1 to channel3, and 0 to channel4.

In this case, the maximum potential communication rate of the system increases by three times. The technical implementation possibility is as follows. If the maximum communication rate per channel is 2.5 Gbps, the overall maximum communication rate can be up to 7.5 Gbps.

Here, if a DBR-LD is used as the wavelength tunable laser and the channel spacing is 100 GHz (0.8 nm), more than 10 channels can be switched, and the maximum communication rate can be more than 22.5 Gbps.

Since a switching speed of a DBR-LD or an SGDBR-LD used in an embodiment of the present invention is a micro second unit, the channel switching also can be achieved in a micro second unit. In addition, though a switching speed is a little slow, a wavelength tunable laser using an external cavity tunable laser (ECTL) or a microelectromechanical system (MEMS) can be used.

For the DBR-LD, up to 40 GHz by direct modulation has been reported in papers, and for the SGDBR-LD, a 2.5 Gbps product obtained by integrating electro-absorption modulators has been put on the market.

Figure 3:
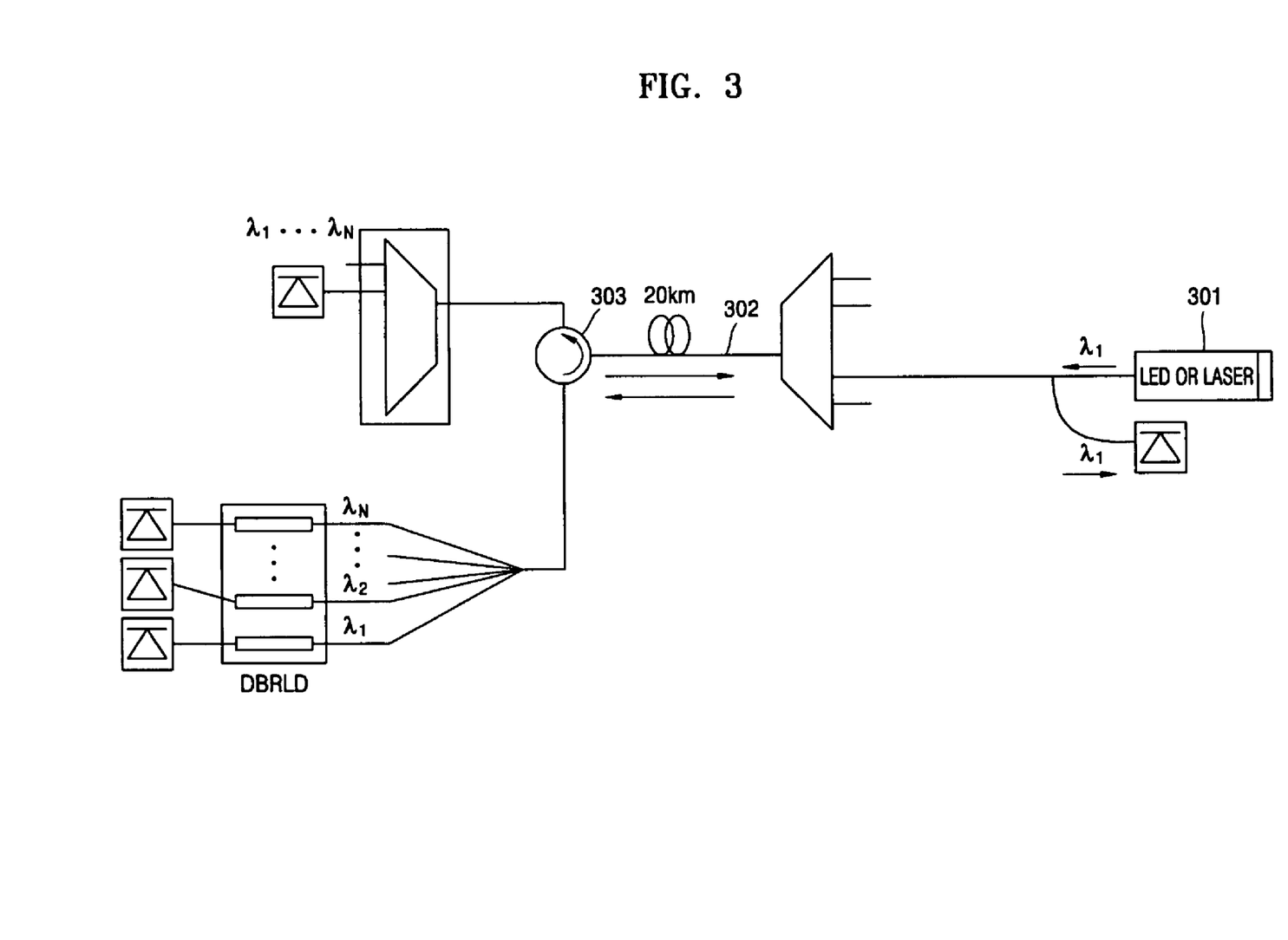
FIG. 3 is a schematic diagram of the configuration of a WDM-PON system having a channel switching function, in which an ONU of the channel switching WDM-PON system of FIG. 1 is modified.

FIG. 3 is a schematic diagram of the configuration of a WDM-PON system having a channel switching function, in which an ONU of the channel switching WDM-PON system of FIG. 1 is modified.

The WDM-PON system of FIG. 3, which uses an optical generator 301, such as a laser or an LED, in the ONU, further includes an optical circulator 303.

Compared to FIG. 1, the modified channel switching WDM-PON system of FIG. 1 has the advantages that a typical signal structure is used without using a loop-back signal structure, and only one piece of optical fiber 302 is used between a CO and an RN.

However, in the modified channel switching WDM-PON system, channel switching is possible, but there is not the wavelength tracing function as in FIG. 1. That is, in the structure of FIG. 1, since the wavelengths generated by light sources in an OLT are fed back to a signal detector in the OLT, wavelength tracing is possible without a separate detour line.

Figure 4:
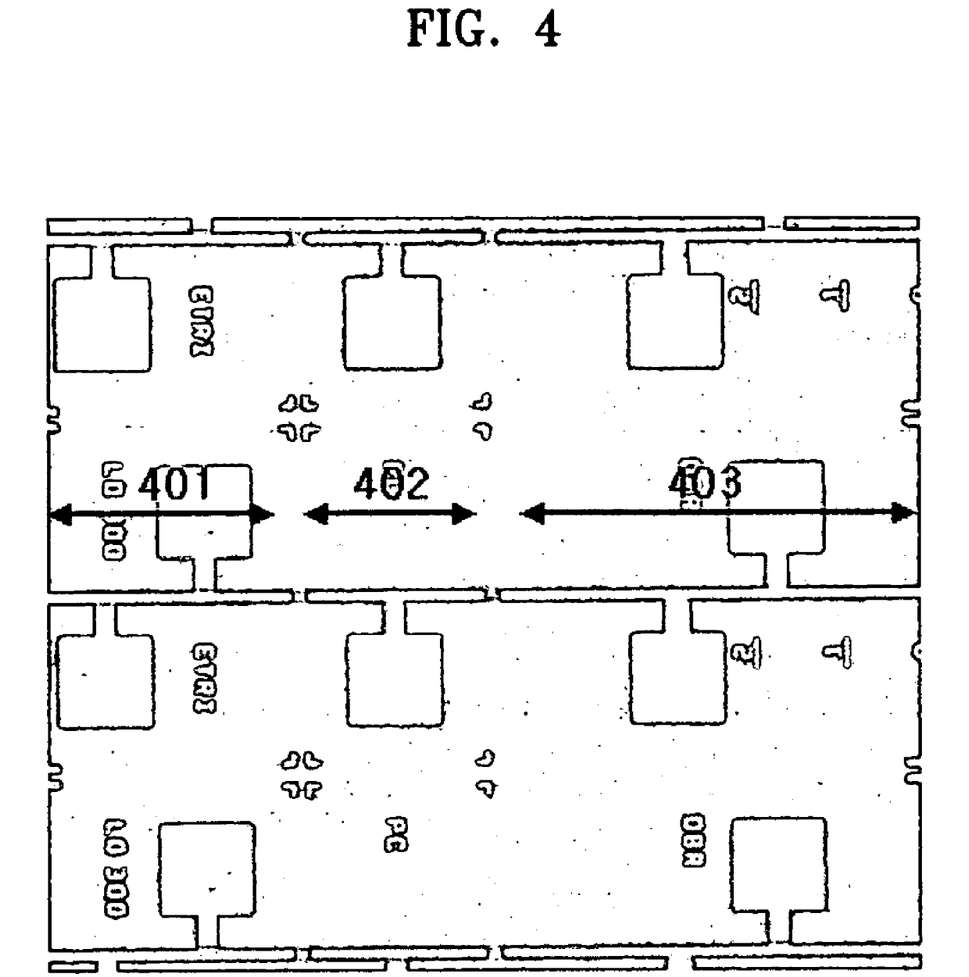
FIG. 4 is a photomicrograph of a distributed Bragg reflector laser diode (DBR-LD) used in an embodiment of the present invention.

FIG. 4 is a photomicrograph of a DBR-LD used in an embodiment of the present invention.

The total length of the DBR-LD of FIG. 4 is 700~1000 nm, and the output intensity is 5~10 mW when a current of 80 mA is injected. A reference number 401 of FIG. 4 indicates an active zone, a reference number 402 indicates a phase control zone, and a reference number 403 indicates a DBR zone.

Figure 5:
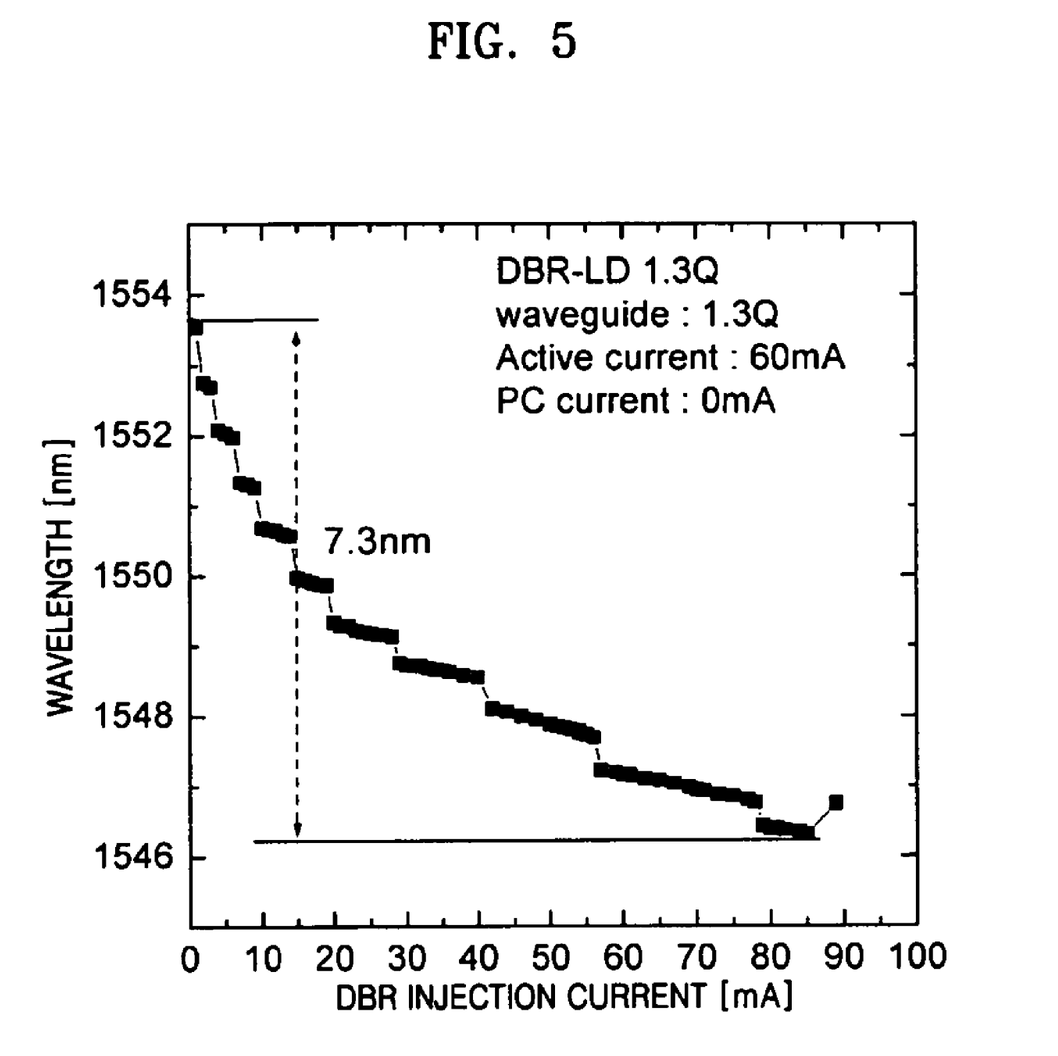
FIG. 5 is a diagram showing a wavelength tunable characteristic of the DBR-LD used in an embodiment of the present invention.

FIG. 5 is a diagram showing a wavelength tunable characteristic of the DBR-LD used in an embodiment of the present invention. As shown in FIG. 5, the wavelength of an output beam is changed by changing the magnitude of a current injected into the DBR zone.

Figure 6:
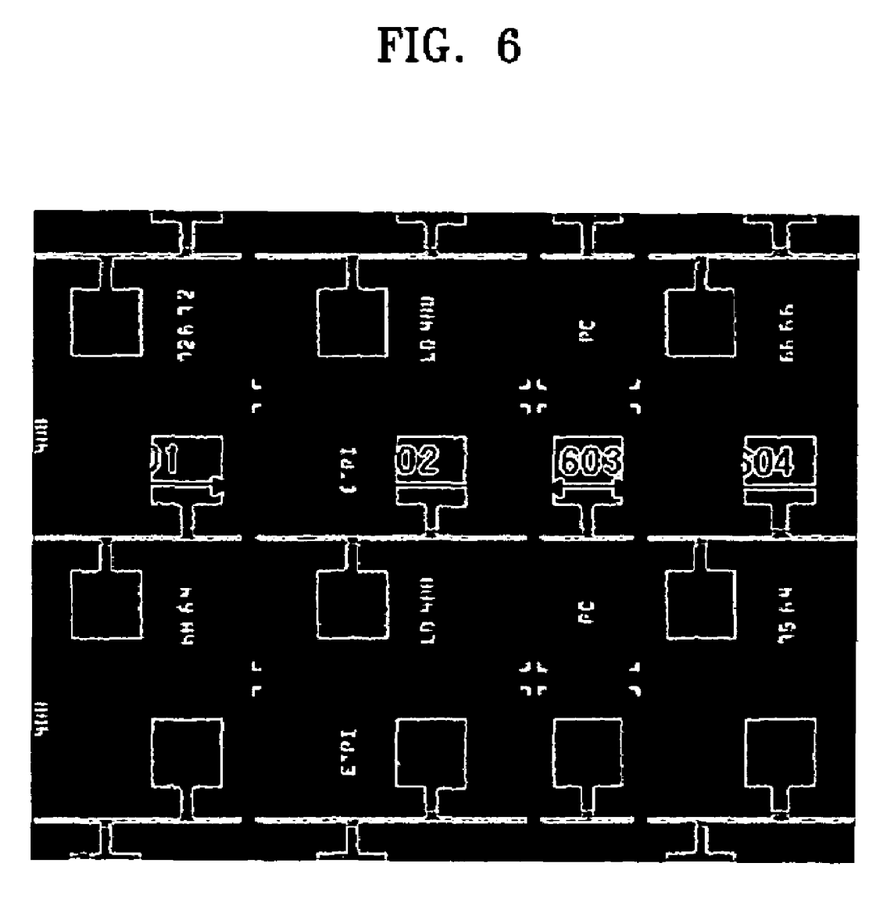
FIG. 6 is a photomicrograph of a sampled grating distributed Bragg reflector laser diode (SGDBR-LD) used in an embodiment of the present invention.

FIG. 6 is a photomicrograph of an SGDBR-LD used in an embodiment of the present invention.

The total length of the SGDBR-LD of FIG. 6 is 1~1.5 mm, and the optical output intensity is a little lower than or similar to the output intensity of the DBR-LD of FIG. 4. A reference number 602 of FIG. 6 indicates an active zone, a reference number 603 indicates a phase control zone, and reference numbers 601 and 604 indicate SGDBR zones located at both ends.

Figure 7:
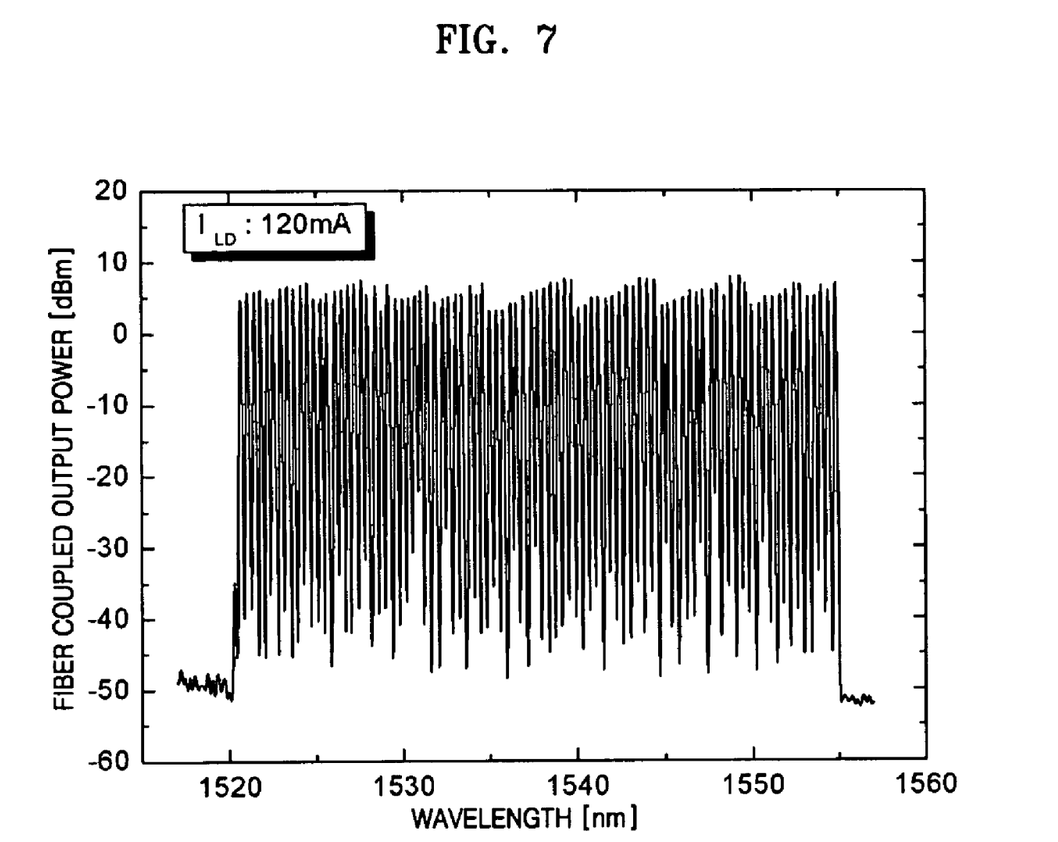
FIG. 7 is a diagram showing a wavelength tunable characteristic of the SGDBR-LD used in an embodiment of the present invention.

FIG. 7 is a diagram showing a wavelength tunable characteristic of the SGDBR-LD used in an embodiment of the present invention. In FIG. 7, a wavelength tunable zone is 35 nm between 1520 nm and 1555 nm.

The present invention may be embodied in a general-purpose computer by running a program from a computer-readable medium, including but not limited to storage media such as magnetic storage media (ROMs, RAMs, floppy disks, magnetic tapes, etc.), optically readable media (CD-ROMs, DVDs, etc.), and carrier waves (transmission over the internet). The present invention may be embodied as a computer-readable medium having a computer-readable program code unit embodied therein for causing a number of computer systems connected via a network to effect distributed processing.

As described above, according to embodiments of the present invention, by changing wavelengths generated by light sources and time-multiplexing channels transmitted from an OLT to an ONU, channels can be switched, and transmission efficiency can increase.

In addition, by using a wavelength tunable laser in each light source, when an RSOA or an SOA is used in the ONU, a channel wavelength of an AWG in the OLT can match a channel wavelength of an RN by tracing wavelengths.

Here, since the wavelength tunable laser can change its wavelength according to a current, a circuit can be simplified by reducing the number of TECs, thereby saving costs.

While this invention has been particularly shown and described with reference to preferred embodiments thereof, it will be understood by those skilled in the art that various changes in form and detail may be made therein without departing from the spirit and scope of the invention as defined by the appended claims. The above-described embodiments should be considered in a descriptive sense only, and are not for purposes of limitation. Therefore, the scope of the invention is defined not by the detailed description of the invention but by the appended claims, and all differences within the scope will be construed as being included in the present invention.

What is claimed is:

1. A channel switching system in a wavelength division multiplexing passive optical network (WDM-PON), the system comprising:

a signal generator generating signals on N channels using N light sources, for N>than 1, each light source including a wavelength tunable laser, wherein the wavelength tunable laser is a distributed Bragg reflector laser diode (DBR-LD) or a sampled grating distributed Bragg reflector laser diode (SGDBR-LD);

a channel tuner switching channels by changing the wavelengths of the lasers so that at least one of the N channels have the same wavelength;

a time division multiplexing (TDM) unit time-multiplexing two or more channels of the at least one of the N channels having the same wavelength; and a tracer optimizing a signal of a signal detector by monitoring a relative magnitude change between the signals of the signal detector and wavelength optical signals of the light sources and properly changing wavelengths of the light sources and a temperature of a thermo-electric controller if the signal of the signal detector deteriorates.

2. The system of claim 1, wherein the wavelength of the laser is changed by a current.

3. The system of claim 1, wherein each light source generates a wavelength optical signal which carries downstream data to be transmitted from an optical line terminal (OLT) in the WDM-PON to each optical network unit (ONU) using the wavelength tunable laser.

4. A channel switching system in a wavelength division multiplexing passive optical network (WDM-PON), the system comprising:

a channel switching unit switching N channels using N light sources, for N>1, each light source including a wavelength tunable laser, wherein the wavelength tunable laser is a distributed Bragg reflector laser diode (DBR-LD) or a sampled grating distributed Bragg reflector laser diode (SGDBR-LD);

a signal detector detecting the wavelength optical signal of a channel generated by the channel switching unit, transmitted downstream to an optical network unit (ONU), and transmitted upstream to an optical line terminal (OLT); and a tracer optimizing a signal of the signal detector by monitoring a relative magnitude change between the signals of the signal detector and wavelength optical signals of the light sources and properly changing wavelengths of the light sources and a temperature of a thermo-electric controller if the signal of the signal detector deteriorates.

5. The system of claim 4, wherein the ONU comprises:

a signal amplifier using a loop-back signal and amplifying wavelength optical signals of channels downstream transmitted from the OLT.

6. The system of claim 4, wherein the ONU comprises:

a reflective semiconductor optical amplifier (RSOA) or a SOA (semiconductor optical amplifier) using a loop-back signal.

7. The system of claim 4, wherein the wavelength of the laser is changed by a current.

8. The system of claim 5, further comprising:

a remote signal detector detecting wavelength optical signals of channels transmitted downstream from the OLT to the ONU.

9. The system of claim 4, wherein the channel switching unit comprises:

a channel tuner switching channels by changing wavelengths of the lasers so that at least one channel of the N channels have the same wavelength; and a time division multiplexing (TDM) unit time-multiplexing two or more channels of the at least one channel having the same wavelength.

10. A channel switching method in a wavelength division multiplexing passive optical network (WDM-PON), the method comprising:

generating signals on N channels using N light sources, each light source including a wavelength tunable laser, wherein the wavelength tunable laser is a distributed Bragg reflector laser diode (DBR-LD) or a sampled grating distributed Bragg reflector laser diode (SGDBR-LD);

switching channels by changing the wavelengths of the lasers so that at least one channel of the N channels have the same wavelength;

time-multiplexing two or more channels of the at least one channel having the same wavelength; and optimizing a signal of a signal detector by monitoring a relative magnitude change between the signals of the signal detector and wavelength optical signals of the light sources and properly changing wavelengths of the light sources and a temperature of a thermo-electric controller if the signal of the signal detector deteriorates.

11. The method of claim 10, wherein the wavelength of the laser is changed by a current.

12. The method of claim 10, wherein each light source generates a wavelength optical signal which carries downstream data to be transmitted from an optical line terminal (OLT) in the WDM-PON to each optical network unit (ONU) using the wavelength tunable laser.

* * * * *